(12) United States Patent
Chong et al.

(10) Patent No.: US 6,839,193 B2
(45) Date of Patent: Jan. 4, 2005

(54) METHOD AND APPARATUS FOR DETERMINING READ-TO-WRITE HEAD OFFSET OF A DISK DRIVE

(75) Inventors: Fong Kheon Chong, Singapore (SG); Quek Leong Choo, Singapore (SG); Myint Ngwe, Singapore (SG); Jun Wang, Singapore (SG); Kah Liang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 389 days.

(21) Appl. No.: 10/016,341

(22) Filed: Dec. 11, 2001

(65) Prior Publication Data

US 2003/0026017 A1 Feb. 6, 2003

Related U.S. Application Data

(60) Provisional application No. 60/310,369, filed on Aug. 6, 2001.

(51) Int. Cl.$^7$ ............................. G11B 27/36; G11B 5/09
(52) U.S. Cl. ............................. 360/31; 360/46; 360/53; 360/76
(58) Field of Search ............................. 360/31, 77.02, 360/77.06, 77.08, 77.05, 76, 77.04, 66, 77.01, 65, 75, 53, 46, 77.07, 78.09, 72.1, 72.2, 74.1

(56) References Cited

U.S. PATENT DOCUMENTS

| | | | | |
|---|---|---|---|---|
| 4,982,295 A | * | 1/1991 | Yakuwa et al. | 360/77.04 |
| 5,802,584 A | | 9/1998 | Kool et al. | |
| 5,812,335 A | | 9/1998 | Kool et al. | |
| 5,812,755 A | | 9/1998 | Kool et al. | |
| 5,867,353 A | * | 2/1999 | Valent | 360/135 |
| 5,986,847 A | * | 11/1999 | Le et al. | 360/78.14 |
| 6,061,201 A | * | 5/2000 | Woods | 360/77.06 |
| 6,072,650 A | | 6/2000 | Wilson | |
| 6,252,731 B1 | | 6/2001 | Sloan et al. | |
| 6,275,346 B1 | * | 8/2001 | Kim et al. | 360/31 |
| 6,476,992 B1 | * | 11/2002 | Shimatani | 360/46 |
| 6,631,046 B2 | * | 10/2003 | Szita et al. | 360/75 |

\* cited by examiner

*Primary Examiner*—David Hudspeth
*Assistant Examiner*—Natalia Figueroa
(74) *Attorney, Agent, or Firm*—David K. Lucente; Derek J. Berger

(57) ABSTRACT

A method for optimizing the read-to-write offset of a disk drive system in respect of a track is provided. In one aspect the method includes the step of determining a first read position amongst a range of test positions offset relative to the track on the basis of read signal strength. The method further includes the steps of calculating a subrange of test positions about the first read position, selecting a second read position from the subrange on the basis of bit error rates and setting the read-to-write offset as a function of the second read position. In addition a disk drive system including means for optimally setting the read-to-write offset in respect of a track is provided.

19 Claims, 8 Drawing Sheets

METHOD AND APPARATUS FOR DETERMINING READ-TO-WRITE HEAD OFFSET OF A DISK DRIVE

CROSS REFERENCE TO RELATED APPLICATIONS

This application claims the benefit of U.S. Provisional Application No. 60/310,369, filed Aug. 6, 2001.

FIELD OF THE INVENTION

The present invention relates to a hard disk drive of the type that includes separate read and write head elements and a rotary type actuator. More specifically the present invention concerns an improved disk drive capable of rapidly determining read/write offset for each track of a drive in order to reduce track mis-registration.

DESCRIPTION OF RELATED ART

In a conventional magnetic hard disk data storage device, data is stored in a series of concentric tracks formed on the surface of one or more rotating disks or "platters". A magnetic disk typically comprises a disk substrate having a surface on which a magnetic material is deposited. The digital data stored on a disk is represented as a series of variations in magnetic orientation of the disk's magnetic material. Variations in magnetic orientation, generally comprising reversals of magnetic flux, represent binary digits of ones and zeroes that in turn represent data. The binary digits must be read from and recorded onto the disk surface in close proximity to the disk. That is, a read/write head can produce and detect variations in magnetic orientation of the magnetic material as the disk rotates relative to the head. Modern hard disk drives typically incorporate magneto-resistive (MR) head assemblies in which the read element and the write element are separated by a small space.

Conventionally, the read/write head is mounted on an actuator arm that is moved across the disk by a servo assembly including a voice coil motor (VCM). A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track. Furthermore the actuator arm position for writing data is different from the optimal position for reading data back by a small but non-negligible amount called the "MR offset" or "read/write offset" which is related to the spacing between the read and write elements and the radius of each track. It will be understood that positioning read/write heads is one of the most critical aspects of recording and retrieving data in disk storage systems.

Over the last few decades the there has been a continual increase in the data capacity of disk drives due to an increase in the track density. As tracks have become narrower and closer together the demand for accuracy when determining the MR offset for each track has also increased. Furthermore, because time taken to test a drive translate directly to manufacturing cost, thus minimizing test time becomes important. Accordingly, it would be desirable if a method of determining the optimal MR offset for each track of a hard disk was provided which, while being accurate is also not overly time-consuming.

BRIEF SUMMARY OF THE INVENTION

According to a first embodiment of the present invention there is provided a method for determining a read-to-write offset between the read and write elements for a track of a disk in a disk drive system including a rotatable storage disk and a read/write head with a read element that reads information from tracks of the disk to produce a read signal and a write element that writes information to the tracks, the method comprising the steps of:

determining a first read position amongst a range of test positions offset relative to the track on the basis of read signal strengths determined at each of said test positions;

calculating a subrange of said range of test positions inclusive of the first read test position;

selecting a second read position from said subrange on the basis of bit error rates calculated at test positions of said subrange; and setting the read-to-write offset as a function of the second read position.

Preferably the subrange is centered on the first read test position.

The step of setting the read-to-write offset as a function of the second read position may comprise setting the read-to-write offset to the difference of the second read position and a value indicating a centerline of the track.

In a preferred embodiment of the invention the step of determining the first read position includes the steps of:

writing signal strength test data at a write position relative to the track;

selecting the first read position from a range of test positions offset relative to the track, said first read test position corresponding to a strongest read signal strength.

The method may further include a step of erasing tracks neighboring said track prior to selecting the first read position.

Preferably the step of selecting the first read position comprises:

moving the read element to each of the range of test positions;

reading the signal strength test data at each of the test positions;

storing a value indicating read signal level strength for each of the range of test positions in memory;

setting the first read position to a test position of said range having a stored value indicating greatest read signal level.

The step of storing a value indicating read signal level strength for each of the range of test positions may comprise storing a level of automatic gain applied to normalize the read signal strength.

In a preferred embodiment the value in the memory indicating maximum read signal level is a minimum value of automatic gain control.

Preferably the step of writing signal strength test data comprises writing an automatic gain control data field and the step of reading the signal strength test data comprises reading the automatic gain control data field.

The step of selecting a second read position may include:

writing a bit pattern at a write position of the track; and selecting the second read position as being a test position in said subrange at which a lowest bit error rate is recorded.

It is desirable that method includes a step of erasing tracks neighboring said track prior to selecting the second read position.

Preferably the step of selecting the second read position includes:

moving the read element to each position of the subrange of test positions;

calculating the bit error rate at each of the read test positions;

storing the bit error rate for each of the read test positions in a memory; and setting the second read test position to a test position having a minimum bit error rate stored in memory.

The step of writing the bit pattern preferably comprises wedge writing the bit pattern and similarly reading the bit pattern preferably comprises wedge reading the bit pattern.

According to a further aspect of the present invention there is provided a disk drive system of the type including a storage disk, and a rotary actuator coupled to a read/write head with separate read and write elements, the disk drive system further including:

means for controlling the rotary actuator operative to move the read head to each of a range of test positions offset from a track of the storage disk;

means for determining a first read position amongst the range of test positions on the basis of read signal strengths determined at each of said test positions;

means for calculating a subrange of said range of test positions inclusive of the first read position;

means for selecting a second read position from said subrange on the basis of bit error rates calculated at each test position of said subrange; and means for setting the read-to-write offset as a function of the second read position.

Preferably the disk drive system further includes:

means for writing signal strength test data at a write position of the track; and means for selecting the first read position from the range of test positions offset relative to the track, said first read test position corresponding to a strongest read signal strength.

Preferably the means for selecting the first read position includes:

means for moving the read element to each position of the range of test positions;

means for reading the signal strength test data at each of the read test positions;

means for storing a value indicating read signal level strength for each test position in memory; and means for setting the read test position to a test position having a stored value indicating greatest read signal level.

The means for selecting a second read position on the basis of bit error rates preferably includes:

means for writing a bit pattern at a write position of the track; and means for selecting the second read position as being a test position in said subrange at which a lowest bit error rate is recorded.

According to a final aspect of the present invention there is provided a disk drive system comprising:

a read/write head having spaced apart read and write elements;

a processor responsive to signals originating from the read element;

an actuator arrangement supporting the read/write head and controllable by the processor;

a processor readable medium coupled to the processor storing instructions for the processor to control the actuator and respond to signals originating from the read head in order to determine a read-to-write offset between the read and write elements for a track of the disk, said instructions including:

instructions for determining a first read position amongst a range of test positions offset relative to the track on the basis of read signal strengths determined at each of said test positions;

instructions for calculating a subrange of said range of test positions centered about the first read position;

instructions for selecting a second read position from said subrange on the basis of bit error rates calculated at each test position of said subrange; and instructions for setting the read-to-write offset as a function of the second read position.

DETAILED DESCRIPTION OF THE PREFERRED EMBODIMENT

Figure 1:
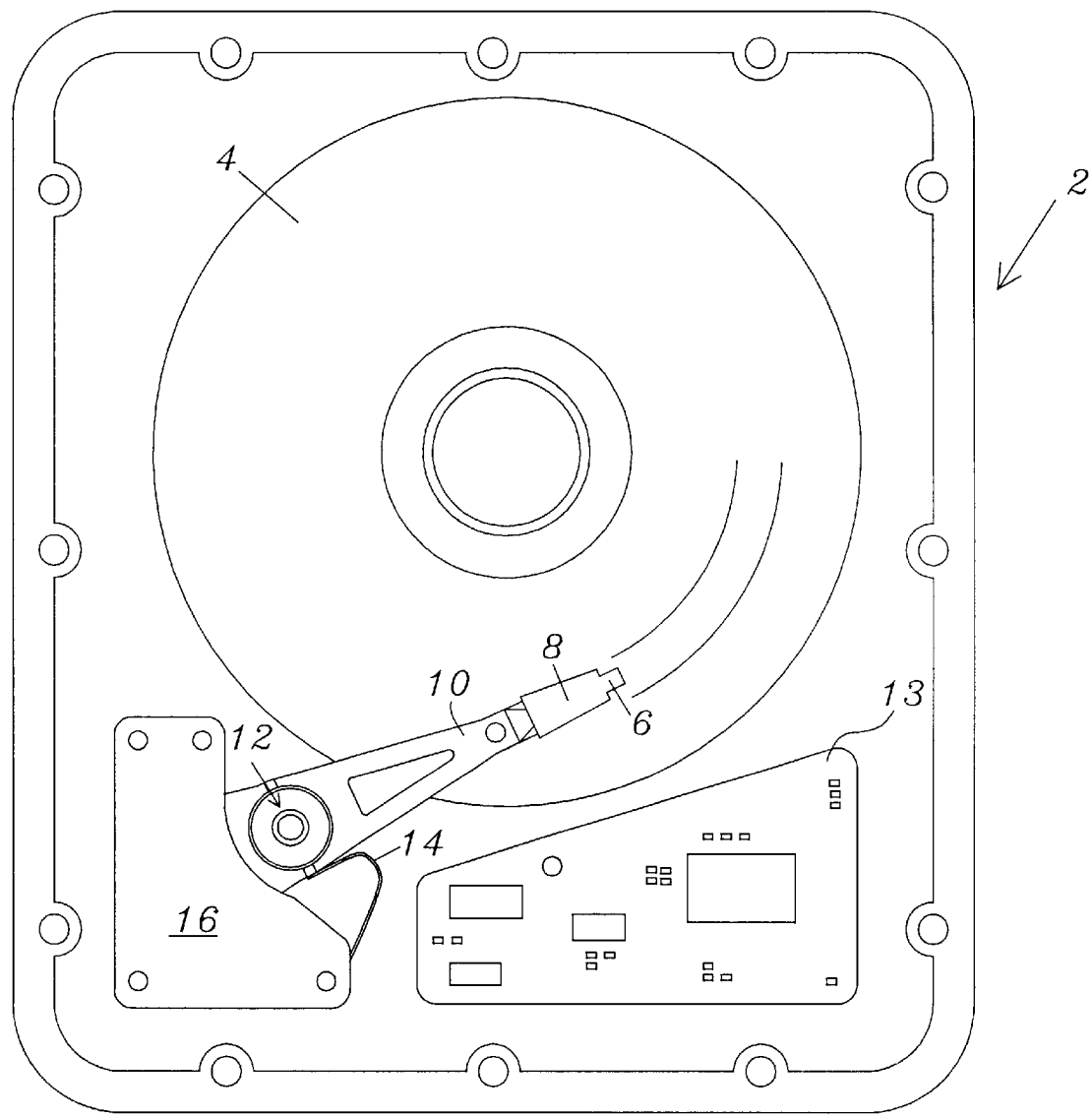
FIG. 1 is a view of a hard disk showing the read/write head in a first position.

FIG. 1 is a plan view of a disk drive 2 with the cover removed. The hard disk drive includes a magnetic platter 4 which comprises a rotatable storage disk operatively rotated at 120 Hz by a spindle motor (not shown). Data is written to and read from concentric tracks on each magnetic platter by read/write head 6. Circuit board 13 contains signal processing and control circuitry as will be explained later with reference to FIG. 6.

In the interests of describing the present invention in a straightforward manner, disk drive 2 has only a single platter and only one read/write head. Multi-stage hard disks having several platters and read/write heads are also well known however and the present invention also finds application with them.

Read/write head 6 is supported by a slider 8 which glides over the surface of platter 4. Slider 8 is coupled to an actuator arm 10 which rotates about pivot assembly 12. The actuator arm is biased about the pivot by spring 14 against the action of a voice coil motor located beneath plate 16.

Figure 2:
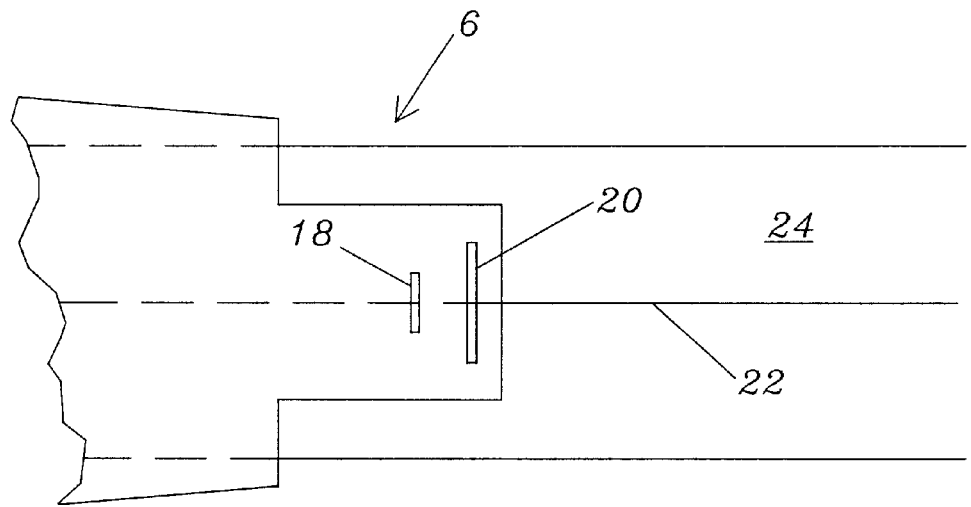
FIG. 2 is a close up view of the hard disk showing a zero read/write offset at the first position.
Figure 4:
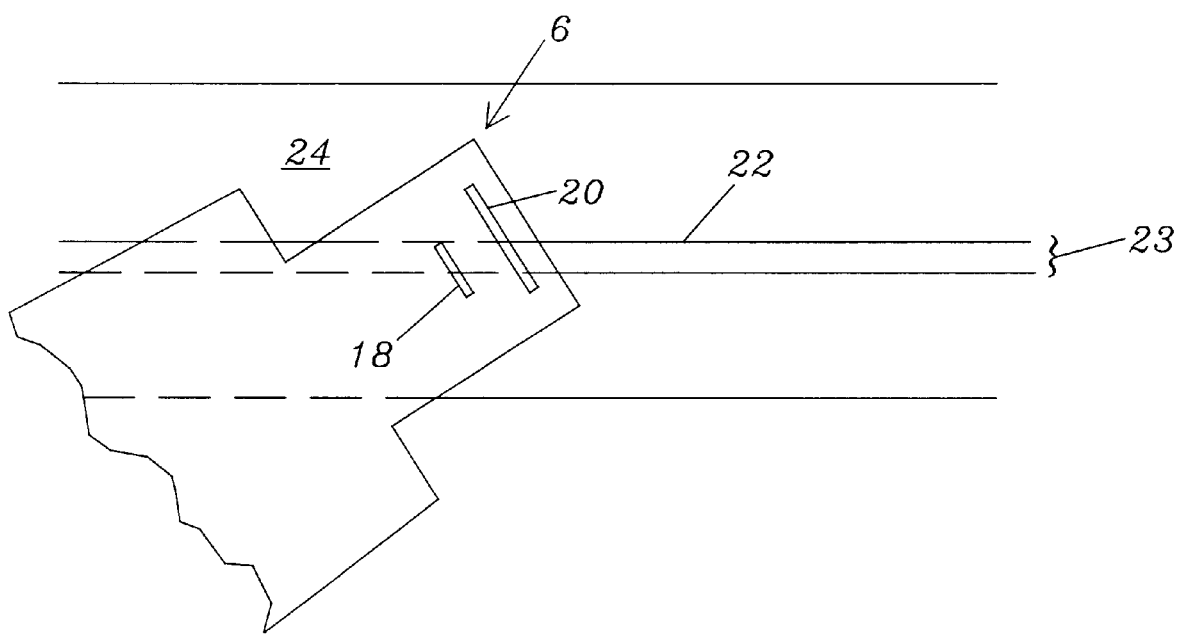
FIG. 4 is a close up view of the hard disk showing the read/write offset at the second position.
Figure 3:
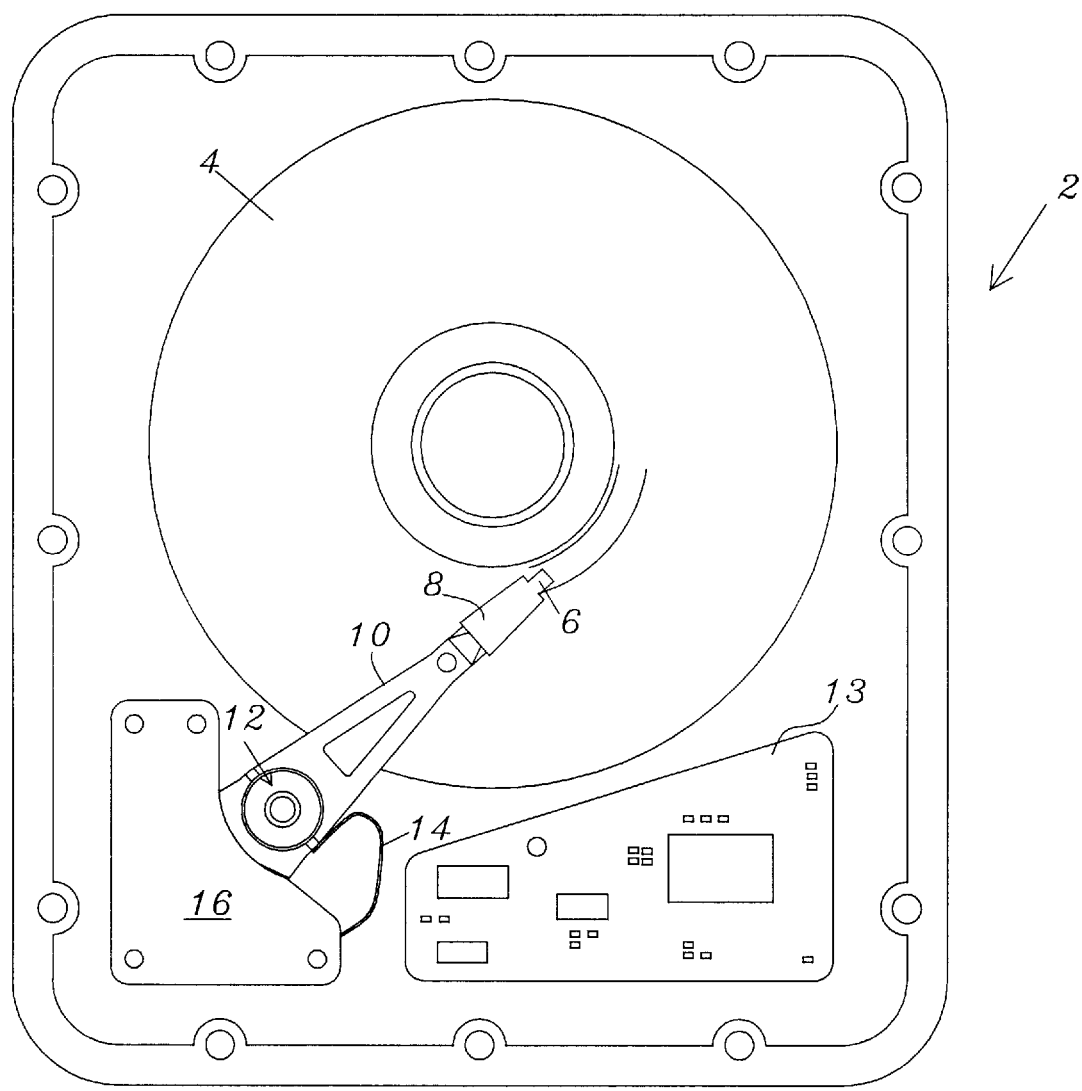
FIG. 3 is a view of the hard disk of FIG. 1 showing the read/write head located at a second position.

With reference to FIG. 2 it will be noted that when actuator arm 10 is in the position shown in FIG. 1 read element 18 is located directly behind the center of write element 20 relative to the centerline 22 of track 24. However as the actuator arm pivots to another position, for example to the position shown in FIG. 3, the midpoint of the read head is offset from the midpoint of the write head by an offset distance (OD) 23 as seen in FIG. 4. It will be understood that the distance OD, which is the optimal read-to-write offset or "MR head offset", varies from track to track. Accordingly, in order for a read operation and a write operation to both be performed over the center of a given track the actuator must be micro-jogged from one position to the other through an offset distance for the track in question. Typically the offset for each track is stored as a look-up table in a memory device coupled to the disk drive's microprocessor.

To assist in controlling the position of read/write head 6 the concentric tracks on platter 4 include a plurality of sectors having servo bits accurately located relative to the centerline of the track.

Figure 5:
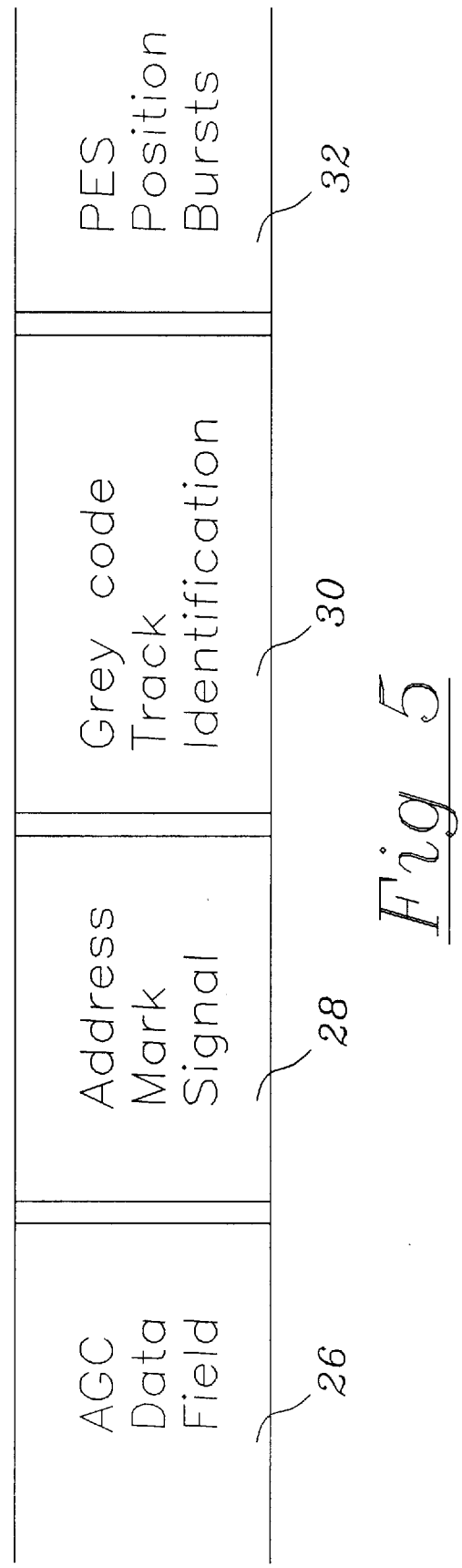
FIG. 5 is diagram showing the servo fields of a track of a hard disk.

FIG. 5 depicts a servo bit sequence consisting of an AGC data field 26, which may be used to set read sensitivity, an address mark signal 28, a grey code 30 identifying the track number and a position error signal (PES) 32 consisting of four position bursts. The position bursts typically consist of one or more cycles of continuous carrier spanning the track to be followed and adjacent tracks on either side.

The signal processing to which the servo readback signal is subjected includes demodulation and decoding of the servo information and also includes the application of automatic gain control (AGC) to the signal read back from the disk's surface. AGC is applied to ensure that the readback signal strength is of relatively constant amplitude regardless of where the read/write head is relative to the track centerline or relative to the surface of the disk. The signal processing circuitry of the disk position control system implements a variable gain function either digitally or with analog circuitry. When the read/write head is over the AGC data field the gain of the recovered signal is adjusted to provide a predetermined constant amplitude signal in order to reduce demodulation errors. For example, when the AGC data field that is detected is of low amplitude then a relatively large amount of AGC is applied whereas when the detected AGC data field is of large amplitude a small degree of AGC is applied.

Figure 6:
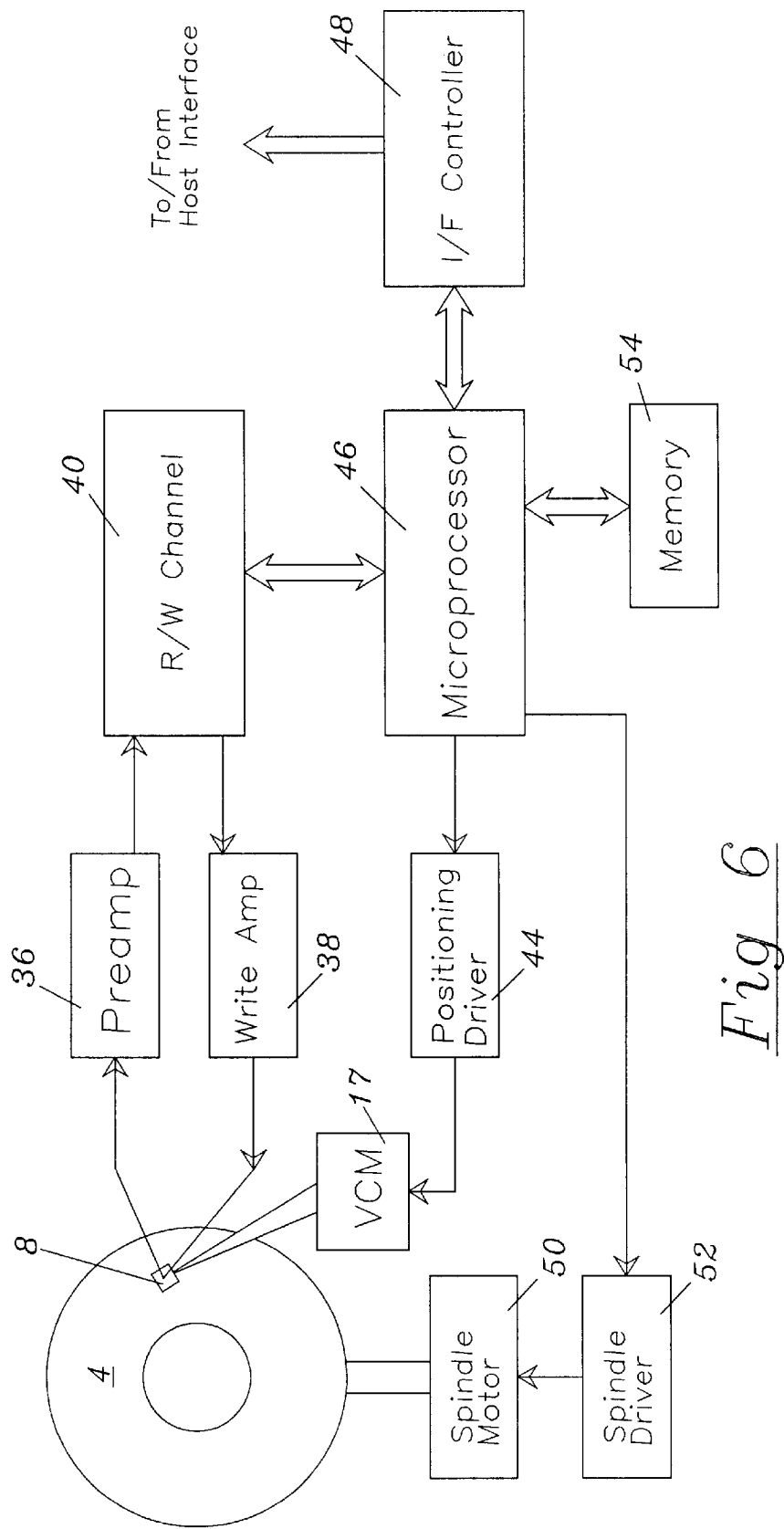
FIG. 6 is a block diagram of the circuitry of the hard disk.

Referring now to FIG. 6 there is depicted a block diagram of the harddisk's circuitry. The circuitry includes a preamplifier 36 which is coupled to a read/write channel circuit 40. The read/write channel circuit contains AGC circuitry for normalizing the output from pre-amp 36. Read/write channel circuit 40 also includes demodulator circuitry for converting the analog signal from the read/write head 8 into a digital signal suitable for processing by microprocessor 46. Channel circuit 40 also includes logic circuits for detecting bit errors when reading data from tracks on platter 4. Data segments of each track are typically encoded according to an error correcting code (ECC).

Microprocessor 46 is programmed to determine the read/write head offset and to generate a look up table, stored in memory device 54, recording the read/write head offset for each track. Instructions for the program that is executed by the microprocessor may be stored in a processor readable medium such as a memory chip coupled. The microprocessor controls a positioning driver 44 which provides positioning currents to voice coil motor 17. By means of spindle driver 52, microprocessor 46 also controls spindle motor 50 which is rotatably coupled to platter 4. An interface controller module 48 is provided to facilitate data communications between the hard disk and external computational devices such as a host computer.

Read/write channel circuit 40 is also coupled to write amplifier 38. The write amplifier is configured to drive the write portion of read/write head 8 in order to convert data signals into magnetic dipoles on the surface of the platter.

Two methods for determining the MR offset will now be explained. A first method is the "AGC scheme". According to the AGC scheme a profile of the signal strength of the read back AGC data field (FIG. 3) is obtained by micro-jogging the head from an initial point being a position, that is −50% of the track's width from the track centerline, to a final point being a position, that is +50% of the track's width from the track centerline, and sensing the signal strengths of the recovered AGC data field at numerous intermediate test positions. For each test point, the amount of AGC that must be applied to normalize the amplitude of the recovered AGC data field signal is determined. The test point at which a minimum of AGC was applied to normalize the signal indicates the point where the readback signal was strongest. Accordingly that point is written to memory as being the optimal MR offset for the particular track. The offset is subsequently retrieved from memory and used in a servo routine to center the MR head during subsequent read operations. The procedure is repeated for every track.

The AGC scheme can be made to operate very quickly if only one track sector is used to determine the MR offset. However, a disadvantage of determining the offset so rapidly is that the final value registered in the AGC register only reflects the signal amplitude of the last sector read. Thus, if the last sector read is off from the track center, the MR offset value that is determined to be optimal will not be suitable for the track. This problem becomes more and more apparent when applied to disks with high track densities.

A second method for determining MR offset is the channel error rate (CER) scheme. The CER scheme uses the channel error rate function of the channel chip to monitor the bit error rate during the read operation for the read head positioned at a range of points across the track in question. The MR offset is determined by writing a predetermined pattern of bits on the track centerline and then, upon incrementally moving the read head across the track from one test point to another, noting the point at which the number of bit errors is a minimum when reading back from the track. In order for the CER scheme to be accurate it has been found that at least $1 \times 10^6$ bits must be read at every MR offset test point. For a modern high capacity disk drive this requirement may translate to 245 non-split sectors read to be written with a predefined bit pattern that must subsequently be read back at each test point to determine the number of errors detected for each point. It will be realized that split sectors cannot be included in the read operation as error code correction bytes would then be taken to be part of the read pattern thereby erroneously increasing the number of error bits recorded.

It is usual in the hard drive industry that the first sector after every index mark is a non-split sector. Thus to accumulate $1 \times 10^6$ bits, there would be 245 physical sector zero reads. Hence, for just one MR offset test point 245 platter revolutions are required in order that enough samples be collected to determine the bit error rate (BER) reliably. Typically 128 offset test points are monitored for each track. The 128 offset test points span a distance equivalent to the spacing across six adjacent tracks.

For a platter spinning at 120 Hz the time taken to determine the optimal MR offset using the CER scheme would be unduly long. However, the CER scheme is considerably more reliable than the AGC scheme as it relies on actual error determinations to find the optimal MR offset point.

Figure 7:
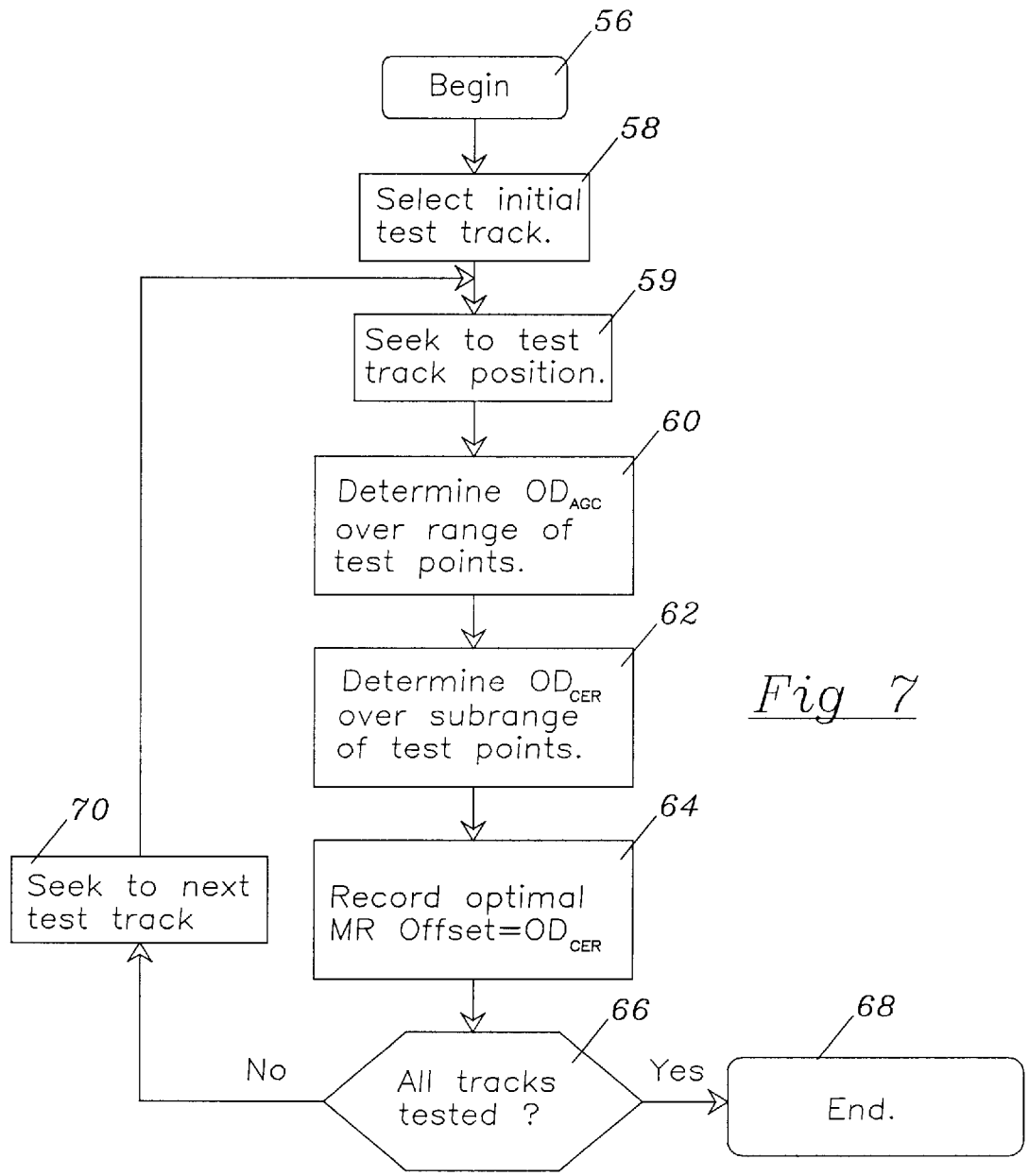
FIG. 7 is a flowchart of method according to an embodiment of the present invention.

A preferred embodiment of the invention will now be described with reference to FIG. 7. FIG. 7 is a high level flow chart of a method according to the preferred embodiment. The method of FIG. 7 is implemented by means of a routine stored in the hard drive's program memory and executed by the hard drive's microprocessor. Alternatively, the routine may be stored remotely and loaded to the microprocessor via the hard drive's interface controller circuit.

At step 56 the microprocessor prepares to execute the routine by making any initializations that may be required, such as initializing variables and allocating memory. At step 58 an initial test track is selected. The microprocessor looks up the corresponding actuator position corresponding to the test track from memory and, at step 59, generates commands to pivot the actuator to the appropriate position.

At step 60 the read write offset at the test track location is determined by using an AGC test scheme. Details of the implementation of the AGC test scheme will be described shortly in relation to FIG. 8. In the presently described preferred embodiment the AGC test scheme is applied over a range of 128 offset test points centered on the test track. As previously mentioned, the 128 test points span a distance equivalent to the spacing across six adjacent tracks. The offset test point at which the strongest AGC signal is received is recorded as $OD_{AGC}$.

At step 62 a CER scheme is used to determine the optimal offset point $OD_{CER}$ over a sub-range of offset test points centered on $OD_{AGC}$. For example the sub range may be ($OD_{AGC}$–P) to ($OD_{AGC}$+P) where P is say 8 so that the sub-range spans 17 points being approximately $\frac{1}{8}^{th}$ the width of the original 128 point range.

It will be noted that while the $OD_{AGC}$ value was determined over 128 offset points using the relatively fast AGC scheme the slower CER scheme is applied over only one eighth the number of offset test points. Accordingly, the AGC scheme is used to quickly narrow down to a subrange of test points in which an optimal test point is likely to lie. The CER strategy is then used to locate the optimal test point in the subrange.

At step 64 the value of the optimal offset point for the test track is recorded in memory. At step 66 the microprocessor decides if all the tracks that are to be tested have been processed. If they have then the routine terminates at step 68. If tracks remain to be processed then control diverts to step 70 where the actuator is controlled to seek to a new test track for subsequent processing in steps 59 to 64 as previously described.

Figure 8:
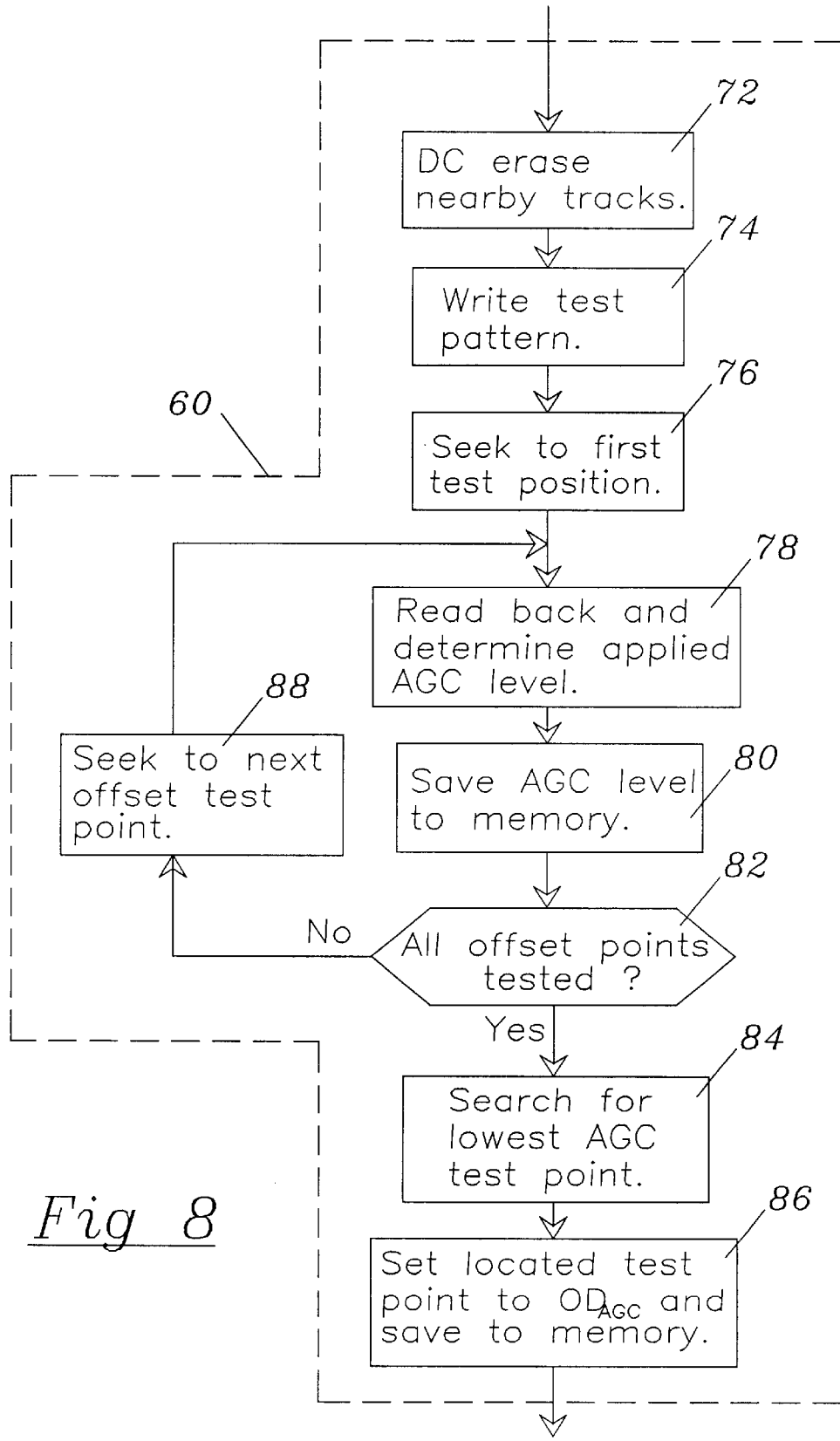
FIG. 8 is a flowchart of a part of the method of FIG. 7.

Details of the AGC scheme processing that occurs in step 60 of FIG. 7 are shown in FIG. 8. At step 72 the microprocessor commands the read write channel and VCM controller to perform a DC erase operation on tracks near to the test track. At step 74 a test pattern is written on the centerline of the test track. The test pattern includes signal strength test data in the form of AGC data fields being signals of the type that are used to calibrate the read head's sensitivity in normal operation. At step 76 the microprocessor controls the actuator to move the read element to the first offset point in the test range centered about the test track centerline. At step 78 a read operation is performed and the magnitude of the AGC that must be applied to normalize the detected AGC data field signal is saved in memory in a data array structure at step 80. The stored AGC magnitudes indicate the read signal strengths at each of the range of test points. At step 82 the microprocessor checks to see if all the offset points have been processed. In the event tat they have not then control diverts to step 88 where the actuator arm is controlled to seek the next point to be processed. Once the procedure has been completed for all the test points then at step 84 a search is performed of the data ray to find the test point $OD_{AGC}$ having the smallest applied AGC signal and hence to the test point where the strongest AGC data field signal was recovered by the read head. The variable $OD_{AGC}$ comprises a first read position which is subsequently used to find a second read position from which the read-to-write offset is determined. At step 86, the present invention sets the located test point to $OD_{AGC}$ and saves that to memory.

Figure 9:
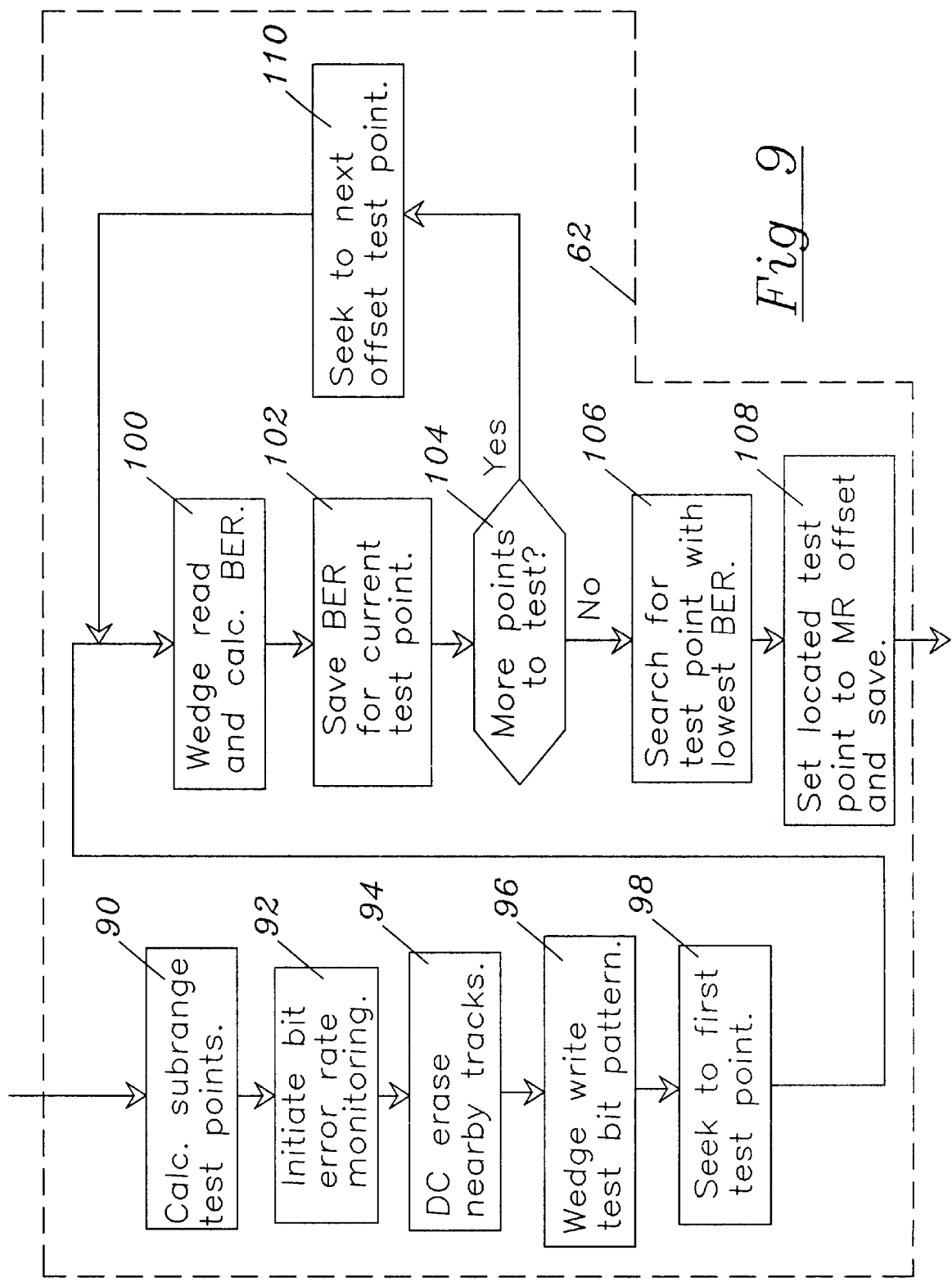
FIG. 9 is a flow chart of another part of the method of FIG. 7.

Reference is now made to FIG. 9 which comprises steps carried out within step 62 of FIG. 7. At step 90 a sub-range of offset test points ($OD_{AGC}$–P) to ($OD_{AGC}$+P) is calculated. In the preferred embodiment the subrange is centered on the first read position $OD_{AGC}$ however it could merely include the first read position rather than be centered on it.

At step 92 the microprocessor sends various commands to the read/write channel circuitry to set it into a mode for bit error rate monitoring. At step 94 a DC erase of tracks neighboring the test track is performed and a wedge write of a data pattern is made onto the test track. As was previously discussed the CER scheme is time consuming to implement in that writing, reading and checking the bit pattern for each test point in order to obtain the bit error rate is relatively lengthy.

According to the preferred embodiment of the invention the time taken to perform the CER scheme may be significantly reduced by introducing wedge write and wedge read operations (at steps 96 and 100) in place of normal write and read operations. The wedge write operation does not have error correction coded (ECC) bytes written together with the data. Without the ECC bytes the wedge read operation can read enough sectors worth of bytes in one revolution of the disk for the channel error rate to be accurately determined. At step 98 the actuator arm is controlled to move the head to the first offset test point of the subrange. The test pattern is then read using a wedge read operation at step 100. At step 102 the error rate corresponding to the test point being processed is saved in a data array. The process is repeated via steps 104 and 110 until all of the offset test points have been processed. At step 106 the memory is searched to find the test point having the lowest error rate. That test point is taken to be the optimal MR offset for the track in question and is saved, either in a servo sector of the track or in memory. At step 108, the MR offset is set to the located test point and saved.

The present invention provides a method for determining read/write head offset that is both relatively fast and accurate when compared to the methods hitherto available.

It is to be understood that the foregoing disclosure is illustrative only, and changes may be made within the principles of the present invention to the full extent indicated by the broad general meaning of the terms in which the appended claims are expressed. Although the preferred embodiment descried herein is directed to a disk drive for a personal computer, it will be appreciated by those skilled in the art that the teaching of the present invention can be applied to other systems without departing from the scope and spirit of the present invention.

We claim:

1. A method comprising the steps of:
   determining a first read position amongst a range of test positions offset relative to a track on the basis of read signal strengths determined at each of the test positions;
   calculating a subrange of the range of test positions inclusive of the first read position;
   selecting a second read position from the subrange on the basis of bit error rates calculated at test positions of the subrange; and setting a read-to-write offset as a function of the second read position.

2. A method according to claim 1, wherein the subrange is centered on the first read test position.

3. A method according to claim 2, wherein the step of determining the first read position includes the steps of:
writing signal strength test data at a write position relative to the track;
selecting the first read position from a range of test positions offset relative to the track, the first read test position corresponding to a strongest read signal strength.

4. A method according to claim 3, including the step of erasing tracks neighboring the track prior to selecting the first read position.

5. A method according to claim 3, wherein the step of selecting the first read position comprises:
moving the read element to each of the range of test positions;
reading the signal strength test data at each of the test positions;
storing a value indicating read signal level strength for each of the range of test positions in memory;
setting the first read position to a test position of the range having a stored value indicating greatest read signal level.

6. A method according to claim 5, wherein the step of storing a value indicating read signal level strength for each of the range of test positions comprises storing a level of automatic gain applied to normalize the read signal strength.

7. A method according to claim 6, wherein the value in the memory indicating maximum read signal level is a minimum value of automatic gain control.

8. A method according to claim 3, wherein the step of writing signal strength test data comprises writing an automatic gain control data field and the step of reading the signal strength test data comprises reading the automatic gain control data field.

9. A method according to claim 1, wherein the step of setting the read-to-write offset as a function of the second read position comprises setting the read-to-write offset to the difference of the second read position and a value indicating a centerline of the track.

10. A method according to claim 1, wherein the step of selecting a second read position includes:
writing a bit pattern at a write position of the track; and
selecting the second read position as being a test position in the subrange at which a lowest bit error rate is recorded.

11. A method according to claim 10 including the step of erasing tracks neighboring the track prior to selecting the second read position.

12. A method according to claim 10, wherein the step of selecting the second read position includes:
moving the read element to each position of the subrange of test positions;
calculating the bit error rate at each of the read test positions;
storing the bit error rate for each of the read test positions in a memory; and
setting the second read test position to a test position having a minimum bit error rate stored in memory.

13. A method according to claim 10, wherein writing the bit pattern comprises wedge writing the bit pattern and wherein reading the bit pattern comprises wedge reading the bit pattern.

14. A system configured:
to move a read head to each of a range of test positions offset from a track of the system;
for determining a first read position amongst the range of test positions on the basis of read signal strengths determined at each of the test positions;
for calculating a subrange of the range of test positions inclusive of the first read position;
for selecting a second read position from the subrange on the basis of bit error rates calculated at each test position of the subrange; and
for setting the read-to-write offset as a function of the second read position.

15. A disk drive system according to claim 14 further including:
means for writing signal strength test data at a write position of the track; and
means for selecting the first read position from the range of test positions offset relative to the track, the first read test position corresponding to a strongest read signal strength.

16. A disk drive system according to claim 15, wherein the means for selecting the first read position includes:
means for moving the read element to each position of the range of test positions;
means for reading the signal strength test data at each of the read test positions;
means for storing a value indicating read signal level strength for each test position in memory; and
means for setting the read test position to a test position having a stored value indicating greatest read signal level.

17. A disk drive system according to claim 14 further comprising:
means for writing a bit pattern at a write position of the track; and
means for selecting the second read position as being a test position in the subrange at which a lowest bit error rate is recorded.

18. A disk drive system comprising:
a read/write head having spaced apart read and write elements;
a processor responsive to signals originating from the read element;
an actuator arrangement supporting the read/write head and controllable by the processor;
a processor readable medium coupled to the processor storing instructions for the processor to control the actuator and respond to signals originating from the read head in order to determine a read-to-write offset between the read and write elements for a track of the disk, the instructions including:
instructions for determining a first read position amongst a range of test positions offset relative to the track on the basis of read signal strengths determined at each of the test positions;
instructions for calculating a subrange of the range of test positions centered about the first read position;
instructions for selecting a second read position from the subrange on the basis of bit error rates calculated at each test position of the subrange; and instructions for setting the read-to-write offset as a function of the second read position.

19. A method comprising the steps of:

determining a first read position amongst a range of test positions offset relative to a track on the basis of a first calculation;

calculating a subrange of the range of test positions inclusive of the first read position;

selecting a second read position from the subrange on the basis of a second calculation calculated at test positions of the subrange; and setting a read-to-write offset as a function of the second read position.

* * * * *